US006669096B1

United States Patent
Saphar et al.

(10) Patent No.: US 6,669,096 B1
(45) Date of Patent: Dec. 30, 2003

(54) SMART CARD READER WITH MICROCONTROLLER AND SECURITY COMPONENT

(75) Inventors: Louis-Pierre Saphar, Toulon (FR); Thierry Karlisch, La Ciotat (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/485,044

(22) PCT Filed: Jul. 27, 1998

(86) PCT No.: PCT/FR98/01659

§ 371 (c)(1),
(2), (4) Date: Jun. 26, 2000

(87) PCT Pub. No.: WO99/06970

PCT Pub. Date: Feb. 11, 1999

(30) Foreign Application Priority Data

Jul. 31, 1997 (FR) ............................................. 97 09821

(51) Int. Cl.⁷ ................................................. G06K 19/06
(52) U.S. Cl. ........................ 235/492; 235/451; 235/375; 235/380; 235/381
(58) Field of Search ................................. 235/492, 451, 235/375, 380, 381, 382

(56) References Cited

U.S. PATENT DOCUMENTS

| 5,036,461 | A | * | 7/1991 | Elliott et al. | 235/380 |
| 5,327,497 | A | * | 7/1994 | Mooney et al. | 235/382 |
| 5,390,331 | A | | 2/1995 | Yui | 711/115 |
| 5,521,362 | A | * | 5/1996 | Powers | 235/380 |
| 5,844,497 | A | * | 12/1998 | Gray | 235/379 |
| 5,901,303 | A | * | 5/1999 | Chew | 235/492 |
| 5,987,134 | A | * | 11/1999 | Shin et al. | 380/30 |
| 6,351,817 | B1 | * | 2/2002 | Flyntz | 380/202 |

FOREIGN PATENT DOCUMENTS

| DE | 3435697 A | 4/1986 |
| EP | 0707290 A | 4/1996 |

* cited by examiner

*Primary Examiner*—Michael G. Lee
*Assistant Examiner*—Kimberly Nguyen
(74) *Attorney, Agent, or Firm*—Burns, Doane, Swecker & Mathis, L.L.P.

(57) ABSTRACT

Smart card readers dedicated to a particular application use both a microcontroller whose read only memory determines the running of the application, and a security component executing, under the control of the microcontroller, subroutines related to the security of the application (authentication, confidential programs, etc.). So that the manager of the application can have access to certain memory areas of the security component, provision is made for the microcontroller to be able to pass automatically to a so-called "transparent" mode, when a specific access code issued by a test card is recognized. In this mode, the read or write instructions for a memory area, issued by the test card, are interpreted by the microcontroller as being read or write instructions for a memory area of the security component rather than the microcontroller.

7 Claims, 6 Drawing Sheets

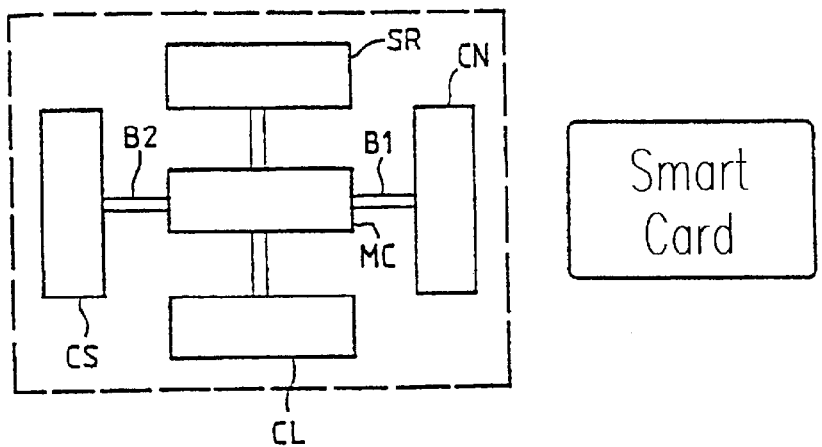
FIG_1
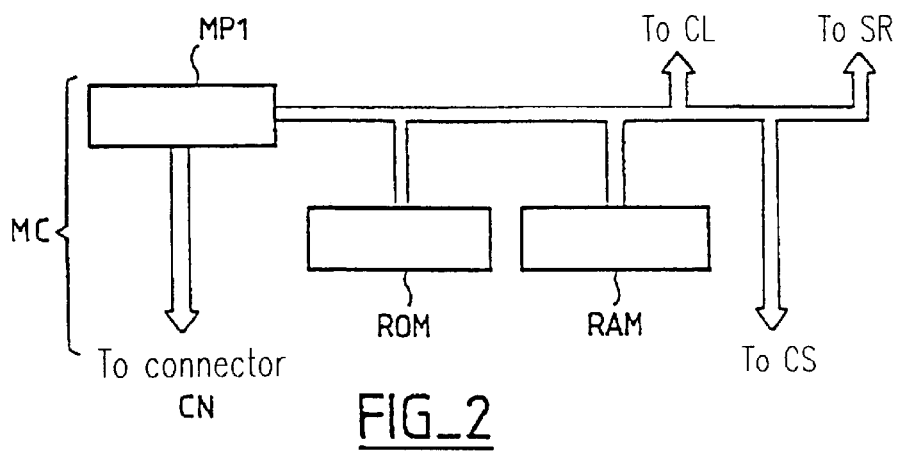
FIG_2
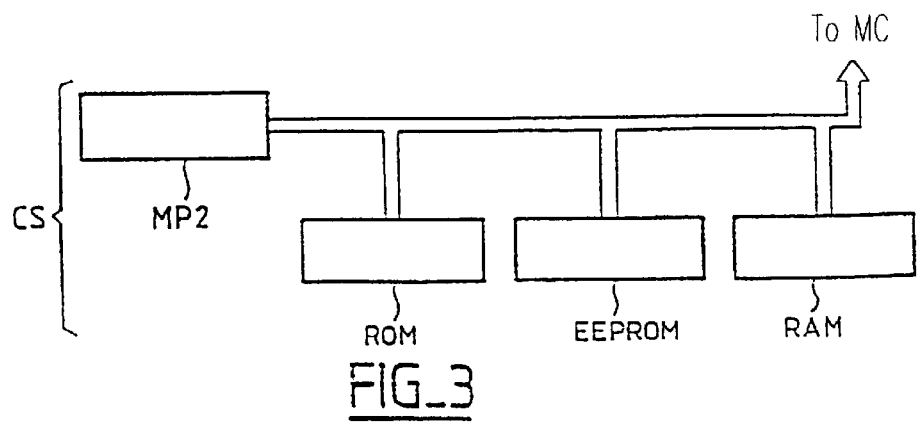
FIG_3

CHANGE TO TRANSPARENT MODE

| Security component | Microcontroller | Smart card |
|---|---|---|
| | 1. Card presence detection | |
| | 2. Card reset | |
| | 3. Await response | |
| | | 4. Response to reset with specific code |
| | 5. Reception of message | |
| | 6. Establishment of a transparent mode flag | |
| | | |

Fig 4

POWERING UP OF SECURITY COMPONENT

| Security component | Microcontroller | Smart card |
|---|---|---|
| | 1. Sending of read command | |
| | | 2. Reception of message |
| | | 3. Sending of command length |
| | 4. Reception of message | |
| | 5. Sending of request for result | |
| | | 6. Reception of message |
| | | 7. Sending of powering-up command |
| | 8. Reception of message | |
| | 9. Powering up and reset of security component | |
| 10. Response to reset | | |
| | 11. Reception of message | |
| | 12. Sending of instruction to write the response to the card | |
| | 13. Await acknowledgement | |
| | | 14. Reception of message |
| | | 15. Execution of writing |
| | | 16. Sending of acknowledgement |
| | 17. Reception of acknowledgement | |
| | | |

Fig 5

READ INSTRUCTION

| Security component | Microcontroller | Smart card |
|---|---|---|
| | 1. Sending of read command | |
| | | 2. Reception of message |
| | | 3. Sending of command length |
| | 4. Reception of message | |
| | 5. Sending of request for result | |
| | | 6. Reception of message |
| | | 7. Sending of read command, with address AD |
| | 8. Reception of message | |
| | 9. Interpretation = sending of read command to security component with address AD | |
| 10. Reception of message | | |
| 11. Execution | | |
| 12. Sending of data | | |
| | 13. Reception of message | |
| | 14. Sending of command to write response in the card | |
| | 15. Await acknowledgement | |
| | | 16. Reception of message |
| | | 17. Execution of writing |
| | | 18. Sending of acknowledgement |
| | 19. Reception of acknowledgement | |
| | | |

Fig 6

WRITE INSTRUCTION

| Security component | Microcontroller | Smart card |
|---|---|---|
| | 1. Sending of read command | |
| | | 2. Reception of message |
| | | 3. Sending of length of command |
| | 4. Reception of message | |
| | 5. Sending of request for result | |
| | | 6. Reception of message |
| | | 7. Sending of write command, with address AD and data DT to be written |
| | 8. Reception of message | |
| | 9. Interpretation = sending of command to write to security component with address AD and data DT | |
| 10. Reception of message | | |
| 11. Execution | | |
| 12. Sending of state word | | |
| | 13. Reception of message | |
| | 14. Sending of command to write the state word in the card | |
| | 15. Await acknowledgement | |
| | | 16. Reception of message |
| | | 17. Execution of writing |
| | | 18. Sending of acknowledgement |
| | 19. Reception of acknowledgement | |
| | | |

Fig 7

SWITCHING OFF OF SECURITY COMPONENT AND RETURN TO NORMAL MODE

| Security component | Microcontroller | Smart card |
|---|---|---|
| | 1. Sending of read command | |
| | | 2. Reception of message |
| | | 3. Sending of command length |
| | 4. Reception of message | |
| | 5. Sending of request for result | |
| | | 6. Reception of message |
| | | 7. Sending of command to switch off security component |
| | 8. Reception of message | |
| | 9. Switching off security device | |
| | 10. Return of flag to its normal mode value | |
| | | |

Fig 8

SMART CARD READER WITH MICROCONTROLLER AND SECURITY COMPONENT

BACKGROUND

This application is based on French Patent Application No. 97/09821, filed on Jul. 31, 1997, which is incorporated by reference herein.

1. Field of the Invention

The invention relates to smart card readers, and more particularly readers whose operation is protected by a security component executing specific programs related to the security of an application.

2. Related Background

Smart card readers are known which are dedicated to the execution of a specific application and which must be protected so that there is no fraud during the execution of the application (notably when the application has financial implications).

These readers have a microcontroller provided with a read only program memory, for executing an application program fixed in this memory. And they also have a security component, distinct from the microcontroller, capable of executing specific programs (related to security or to confidential elements of the application) under the control of the microcontroller so that any communication of data between the smart card and the security component necessarily passes through the microcontroller.

The security component is therefore in some way itself also a microcontroller, with its program memories, but it is not directly connected to an input connector of the reader. It communicates only with the microcontroller which for its part is connected to the input connector. The microcontroller can therefore communicate either with the smart card inserted in the input connector or with the security component and, given that the application is fixed and is run as soon as a smart card is inserted in the reader, it is the microcontroller which acts as a master with respect to the smart card and with respect to the security component.

In order to illustrate the problem which the present invention aims to resolve, an example can be given of a smart card reader dedicated to a particular application placed under the control of a manager for the application, and it is this manager which sells smart cards. Only the cards issued by the provider are authorised. The task of the security component is notably to detect, by means of ciphering and deciphering algorithms, that the card placed in the reader is an authorised card. The microcontroller of the reader controls the running of the entire application; it transmits instructions to the security component and controls the data communication between the card and the security component.

A standard user of the application obviously does not have access to the programs and data of the non-volatile memories of the security component. And the microcontroller programmed by means of a read only memory constitutes the necessary barrier for this user not to be able to know what is occurring in the security component, or to modify it. For example, if the program requires the security component to supply data to the card, it supplies them in principle in encrypted form. And the application program, fixed in the read only memory and therefore not able to be modified by a user, does not provide access to the non-volatile memory areas of the security component.

However, the manager of the application may need, for reasons of testing, fault diagnosis, or even the need for slight modifications in the parameters of the application, to control certain memory contents of the security components, or to modify these contents.

One solution would be to leave the terminals of the security components partly accessible, for example so that it is possible to access them by means of test prods after opening the reader. However, in practice, for security reasons, it is preferred to embed the access pins of the security component completely in a resin.

It can also be envisaged that the read only program memory of the microprocessor contains, in addition to the program of the application to which the reader is dedicated, other programs triggered by special protocols. These programs would therefore be present in advance in the read only memory of the microprocessor and would comprise a priori all the programs for access in read mode or write mode that the manager of the application could need to use subsequently. This is difficult to envisage, and even dangerous if the secret data have to be used (secret code for example).

The aim of the present invention is to propose a means for the manager of the application to be able to gain access easily, for test, diagnosis or modification purposes, to the security component, that is to say in practice to certain memory areas of this security component, without jeopardising the security of the application.

SUMMARY OF THE INVENTION

For this purpose, the invention proposes a smart card reader whose microcontroller has two operating modes, a normal operation, for the use of a standard user, for executing the fixed application program to which the reader is dedicated, and a "transparent" operation, of which the standard user does not have use, in which the microcontroller can receive a smart card or a probe simulating a smart card, access instructions which it interprets not as instructions for access to its own memories, but as instructions for access to the memories of the security component.

More precisely, the invention proposes a card reader having an input connector, a microcontroller, and a security component executing programs under the control of the microcontroller, the microcontroller having a normal operating mode in which it executes a program contained in its read only memory, characterised in that the microcontroller also has a so-called "transparent" operating mode, in which it sets itself automatically to receive a specific code on the input connector and in which it receives from the input connector addressing instructions for memory areas and executes these instructions, interpreting them as being instructions for access to memory areas of the security component.

Thus, although the security component cannot be in direct communication with the input connector, it becomes possible to gain access to memory areas of this component: after going into transparent mode, an address for access to a memory area ceases to be interpreted as a memory address of the microcontroller and becomes a memory address of the security component. The microcontroller will then execute an addressing subroutine for the security component. Conversely, in normal mode, an instruction for addressing a memory area supplied by the input connector is always interpreted as being an addressing instruction for a memory area of the microcontroller.

In practice, the transparent operating mode has four main instructions, which are respectively:

powering up of the security component;

reading a data item at a memory address;

writing a data item to a memory address;

switching off the security component.

If the security component has an electrically programmable non-volatile memory, notably for reasons of customisation, it will be possible to have access to this memory, for the application manager but not for the standard user, in order to change the data thereof. The transparent operating mode will therefore make it possible to modify the content of the areas which cannot be modified by the program executed in normal mode.

BRIEF DESCRIPTION OF THE FIGURES

Other characteristics and advantages of the invention will emerge from a reading of the following detailed description given with reference to the accompanying drawings, in which:

FIG. 1 depicts the general configuration of a smart card reader with a microcontroller and a security component;

FIG. 2 depicts the internal constitution of the microcontroller;

FIG. 3 depicts the internal constitution of the security component;

FIG. 4 depicts a table of sequences executed by the microcontroller and the test card in order to result in passing to transparent mode;

FIGS. 5 to 8 depict diagrams of sequences executed by the microcontroller, security component and (test) card during the execution of each of the main instructions of the transparent mode.

DETAILED DESCRIPTION

The reader has a smart card connector CN, a microcontroller MC and a security component CS. Depending on the application to which the reader is dedicated, it can also comprise a man-machine interface, for example a keyboard CL and a screen SR, to enable the user to enter or read data if this is necessary for the application. The running of the application will in general be triggered simply by the insertion of a smart card into the reader. There may be several applications and an application may be selected for example by means of the keyboard. However, in any event, it is a case of applications fixed in the non-modifiable read only memory.

The card connector CN constitutes the input of the reader (in general an input with six or eight contacts, the exchange of data taking place by means of a communication of the serial type on one of the contacts).

The microcontroller MC is connected to the input connector CN by a first connection bus B1; it is connected to the security component CS by a second connection bus B2. There is no direct connection allowing the passage of data between the security component and the input connector.

The security component is welded to a printed circuit forming the core of the reader, inside the latter. Its connection pins are not physically accessible (in general not even by means of test prods since the pins are covered with a protective resin).

This impossibility of access to the security component is intentional; for standard use of the card, only accesses provided for in advance in the fixed application program of the microcontroller are enabled and are effected by means of the microcontroller.

The microcontroller, in this type of reader dedicated to a very precise application, has program memory of the ROM type, that is to say a non-modifiable memory (read only memory) which contains the instruction sequences allowing the application to run. The microcontroller also has the RAM memory allowing the temporary storage of volatile data. These memories are associated with a microprocessor MP1 which forms the core of the intelligence of the microcontroller. Finally, it has input/output lines in sufficient numbers for communicating firstly with the security component CS, secondly with the input connector CN, and possibly with the keyboard CL and screen SR. FIG. 2 depicts the structure of the microcontroller.

The security component has a similar structure (FIG. 3) since it consists in practice of a microcontroller (that is to say a microprocessor MP2 provided with program and working memories) but, as indicated above, it communicates only with the microcontroller and not with the smart card. It is capable of executing programs placed in its read only memory ROM. In addition, it preferably has a non-volatile memory part, which can be electrically erased and written to (EEPROM memory). In this electrically programmable memory, it is possible to place customisation data for the programs executed by the security component. It is also possible to place data representing variable parameters of these programs.

The security component is capable of receiving instructions and data on its input lines. It executes the instructions, records the data in memory, and returns over the output lines results of instructions which it has executed, notably results of secret calculations made by the programs which it has in its non-volatile memories (ROM and EEPROM).

The smart card inserted into the reader is capable of supplying commands and data to the microcontroller, and more generally of communicating with the microcontroller. In the standard use of the reader, the user has a smart card which he inserts in the reader in order to launch the application. However, it is also possible, for implementing the invention, to insert a probe in the reader, that is to say a simulated card, with the contacts required for communicating with the inputs of the reader, but also connected to a computer terminal. This simulated card allows communication between the outside and the reader for testing or debugging operations. Test smart cards not connected to a computer, but capable of controlling the running of test programs and receiving test data, could also be provided for the requirements of the manager of the application (but not for the standard users of the reader).

The security component CS and smart card are both slave peripherals of the microcontroller MC in the application executed, in the sense that it is the microcontroller which executes the program of the application, the smart card and the security component executing instructions when they are acted on by the microcontroller in the running of the program. The card and security component therefore receive commands (read, write, execution of programs contained in the card or the security component), execute them, and return the execution results to the microcontroller.

The microcontroller is therefore the master with regard to communication with the standard smart card and communication with the security component.

The users of the reader, who will be referred to as standard users, can do only one thing: initiate the execution of the standard application program contained in the ROM memory of the microcontroller.

In order to give a clear understanding of the functioning of these three components (smart card, microcontroller, security component) in the running of the standard application, reference will be made once again to a game of chance application, before describing the invention more precisely.

The standard user has a smart card issued by the manager of the application. This card has elements for authenticating, in the form of data recorded in memory (data which can be verified by the security component) and possibly in the form of authentication programs which, by comparison with programs contained in the security component, will allow authentication of the card by the latter.

The user inserts his card in the reader. In accordance with ISO 7816-3, the microcontroller of the reader detects the insertion of the card, then powers it, and sends it its first command "RESET".

The card receives this command and sends a "RESPONSE TO RESET"; this response allows recognition of the type of card so that the communication can be continued in accordance with a given protocol.

The procedures for authentication of the card then take place between the card and the security component, under the control of the microcontroller, which remains the master.

For example, the microcontroller powers the security component, receives its response to reset, then asks for a random number from it, receives this number and retransmits it to the card. The latter codes this random number using a ciphering program which it has. It returns the encrypted number, a data item and a signature to the security component, by means of the microcontroller. The security component verifies the authenticity, notably by verifying that the encrypted value is correct, verifying the agreement between the data item and the signature, or possibly by other means.

If authenticity is accepted, the user can request to transfer the data item into the security component. If the user must enter the data item to be transferred, it is of course necessary for the reader to have peripherals (keyboard, screen) for making a selection. These peripherals are also managed by the microcontroller and its program.

The security component calculates the new data item of the card and a new signature of the card. The data and signature are encrypted and transmitted to the microcontroller, which enters them in the chip card with a view to a future exchange.

Consequently the application can start up.

The application is executed by a program contained in the non-volatile memory (ROM and EEPROM) of the security component.

What happens in the security component, and notably what is contained in the non-volatile memories of the security component, remains completely unknown to the standard user and is not modifiable. There is no free access to the memories of the security component.

However, the manager of the application may on the other hand wish to have access to the inside of the security component for testing operations, the diagnosis of faults, or even to modify data of the application.

The invention resolves this problem by providing for the automatic passage of the microcontroller to a "transparent" operating mode, different from the normal operating mode, when a special card (or a probe simulating a card and connected to a computer) is inserted into the reader. This passage to transparent mode is not authorised for standard users, and results automatically from the recognition of a specific code at the input of the reader when the special card is inserted.

In practice, passing to transparent mode takes place as follows: the manager of the application, who has the special smart card or the probe including the specific code, can insert it into the reader connector. The insertion of this card or probe is detected by the reader in accordance with a conventional procedure (a simple contact is used for detection). This detection causes on the part of the microcontroller a powering of the card with reinitialisation command (RESET). The reinitialisation command entails a response from the card (Response to reset). The response to reset comprises first of all (in accordance with ISO 7816-3) information on the communication protocol which will be used subsequently, and then a data field which the standard leaves free. A specific code, not known to the standard users of the smart card, is placed in this field by the special card. The response to reset of the special card therefore includes this specific code.

The specific code is recognised by the microcontroller and triggers the change to "transparent" mode.

In transparent mode, commands to read or write to memory, coming from the input of the reader, that is to say coming from the special card or the probe, may be received by the microcontroller. These instructions are accompanied by the memory address which it is necessary to read or write. However, the microcontroller then interprets these addresses as being read or write addresses in a memory of the security component rather than a read or write address in a memory of the microcontroller, as it would do in the normal operating mode.

The change to transparent mode can consist of the initialisation of a state bit or flag in a register of the microcontroller, this flag remaining in a default state corresponding to the normal mode as long as the specific code has not been recognised by the microcontroller and returning to this default state when returning to normal mode. Return to normal mode is effected by a specific instruction given from the card, or following an incident (removal of the card from the reader, etc).

This state bit then diverts the read or write commands received by the microcontroller from the card, and switches them to subroutines (in read only memory of the microcontroller) containing simply a read or write instruction addressed to the security component. The parameters allocated to this instruction, that is to say the address where it is necessary to read or write with the data to be written, are those which are received from the smart card and are transmitted as they are by the subroutine. It will be understood that these subroutines in the read only memory of the microcontroller comprise only the read or write instruction addressed to the security component, but comprise neither the address at which it is necessary to read or write nor the data to be written. The address and data are simply transported from the working memory of the microcontroller to the security component. This is what makes it possible to have access to any memory address of the security component without cluttering the read only memory of the microcontroller with all the addresses at which it might be wished to read or write in the security component during the testing or debugging programs.

In the case of reading in a memory area of the security component, the security component transmits the data item read to the microcontroller, which retransmits it to the smart card.

In addition to the read and write commands, the transparent mode can include a small number of commands coming from the smart card, notably:

an instruction to power the security component, giving rise to a response to reset from the latter and a writing of the response in the card;

an instruction to power the security component, also giving rise to the return of the microcontroller to its normal mode;

possibly a bidirectional instruction comprising a writing of data and a reading of data in the security component.

An instruction code can be allocated to each of the possible commands; the instruction code corresponding to reading or writing can be exactly the same code as was used for reading or writing in normal mode but results in a different execution in transparent mode since it will then consist of a reading or writing in the security component rather than in the memories of the microcontroller.

In general terms, in transparent operating mode, it is possible to provide for the microcontroller to remain the master whilst executing instructions supplied by the special card, in the following manner: it is the microcontroller which systematically sends to the card, when it has finished executing a previous sequence, a command to read the card. In other words, it continuously listens out for a possible command coming from the card.

In order to remain compatible with the protocols of ISO 7816-3, provision can be made, for example, for, in transparent operating mode, the microcontroller to routinely send a command for reading the card; this first of all sends the length of the command which will follow; the microcontroller next sends to the card a result request (the result is the command proper). The card sends the command and a state word. The microcontroller checks the state word and executes the command (that is to say, in practice, in transparent mode, it causes it to be executed by the security component); then it sends a result if necessary; the card sends an acknowledgement. The microcontroller can send a read command.

The diagrams in FIGS. 4 to 8 summarise the sequences executed by the microcontroller, the security component and the special card for various instructions executed in transparent mode.

The diagram in FIG. 4 corresponds to the sequences of passing to transparent mode; the sequences executed are as follows:

by the microcontroller; the detection of the presence of a card, powering (reset) of the card, awaiting a response to the reset;

by the card: response to reset with a specific code in the response;

by the microcontroller: analysis of the response to reset; recognition of the specific code; change to transparent mode, with establishment of the transparent mode signalling flag;

by the security component: no action.

FIG. 5 corresponds to a command to power up the security component:

by the microcontroller: sending of a card reading command; awaiting the response;

by the card: reception; sending the length of the command which follows;

by the microcontroller: reception of the response from the card; sending a result request; awaiting the response;

by the card: reception of the message; sending a command to power up to the security component;

by the microcontroller: reception of the response from the card; powering and reset of the security component; awaiting the response to reset;

by the security component: sending the response to reset;

by the microcontroller: receiving the response; sending an instruction to write the response in the card; awaiting an acknowledgement from the card;

by the card: execution of the write instruction; sending the acknowledgement.

FIG. 6 corresponds to the sending of an outgoing instruction to the security component (data reading):

by the microcontroller: sending of a card reading command; awaiting the response;

by the card: reception; sending the length of the command which will follow;

by the microcontroller: reception of the response from the card; sending a result request; awaiting the response;

by the card: reception of the message; sending a read command, with security component memory area address;

by the microcontroller: reception of the response from the card; interpretation of the command; sending a command to read the security component, at the address indicated by the card; awaiting the response from the security component;

by the security component: reception of the message, execution, sending of the response;

by the microcontroller: receiving the response; sending an instruction to write the response in the card; awaiting an acknowledgement from the card;

by the card: reception of the message; execution of the write instruction; sending of the acknowledgement.

FIG. 7 corresponds to the sending of an incoming instruction (writing in a memory of the security component). This instruction is particularly important for writing in a non-volatile memory (EEPROM) of the security component, for example in order to modify the customisation of the reader or to modify the parameters of the application:

by the microcontroller: sending of a card reading command; awaiting the response;

by the card: reception; sending the length of the command which will follow;

by the microcontroller: reception of the response from the card; sending a result request; awaiting the response;

by the card: reception of message; sending a command to write in the security component, with writing address and data to be written;

by the microcontroller: reception of the response from the card; interpretation of the command; sending of a command to write in the security component, with the data item indicated by the card and the address indicated by the card;

by the security component: reception of the message; execution of the write command; sending of a state word representing the state of execution of the command;

by the microcontroller: reception of the message, sending of an instruction to write the state word in the card; awaiting an acknowledgement from the card;

by the card: execution of the write instruction; sending of the acknowledgement.

For a bidirectional instruction (write +read) the principle would be the same.

FIG. 8 corresponds to the switching off of the security component and to the output of the transparent mode:

by the microcontroller: sending of a read command to the card; awaiting the response;

by the card: reception; sending of the length of the command which will follow;

by the microcontroller: reception of the response from the card; sending of a result request; awaiting the response;

by the card: reception of the message; sending a command to power down the security component, with a state word for the card;

by the microcontroller: reception of the response from the card; verifying the state word; powering down the security component; re-establishing the transparent mode flag at its default value corresponding to normal mode.

What is claimed is:

1. A smart card reader comprising:

an input connector that interfaces with a smart card;

a microcontroller; and a security component executing programs under the control of the microcontroller, the microcontroller having a normal operating mode in which the microcontroller executes a program contained in a read only memory of the microcontroller, wherein the microcontroller also has a transparent operating mode that is automatically set upon receipt of a specific code on the input connector, and wherein the microcontroller receives from the input connector addressing instructions for memory areas and executes these instructions, interpreting them as instructions for access to memory areas of the security component, wherein the security component has an electrically programmable memory, and the transparent operating mode permits access to this memory in order to modify the content of areas which are not modifiable by the program executed in normal mode.

2. A card reader according to claim 1, wherein the security component can communicate with the input connector only by means of the microcontroller and under the command thereof.

3. A card reader according to claim 2, wherein the reader is dedicated to a given application whose execution is defined by the program contained in the read only memory of the microcontroller, this application not having any possibility of access to certain memory areas of the security component.

4. A card reader according to claim 2, wherein the transparent operating mode has four principal instructions, which are respectively:

powering up of the security component;

reading of a data item at a memory address;

writing of a data item to a memory address;

switching off the security component.

5. A card reader according to claim 1, wherein the reader is dedicated to a given application whose execution is defined by the program contained in the read only memory of the microcontroller, this application not having any possibility of access to certain memory areas of the security component.

6. A card reader according to claim 3, wherein the transparent operating mode has four principal instructions, which are respectively:

powering up of the security component;

reading of a data item at a memory address;

writing of a data item to a memory address; and switching off the security component.

7. A card reader according to claim 1, wherein the transparent operating mode has four principal instructions, which are respectively:

powering up of the security component;

reading of a data item at a memory address;

writing of a data item to a memory address; and switching off the security component.

* * * * *